United States Patent
Yang et al.

(10) Patent No.: US 10,642,334 B2
(45) Date of Patent: May 5, 2020

(54) COMPUTER DEVICE AND POWER ABNORMALITY DETECTION METHOD FOR A COMPUTER DEVICE

(71) Applicant: Wistron Corp., New Taipei (TW)

(72) Inventors: Ke Yang, New Taipei (TW); Kai Cheng Lee, New Taipei (TW); Jia Sheng Huang, New Taipei (TW); Mei Ling Shang, New Taipei (TW); Wei Liang Liao, New Taipei (TW)

(73) Assignee: WISTRON CORP., New Taipei (TW)

( * ) Notice: Subject to any disclaimer, the term of this patent is extended or adjusted under 35 U.S.C. 154(b) by 191 days.

(21) Appl. No.: 15/943,856

(22) Filed: Apr. 3, 2018

(65) Prior Publication Data

US 2019/0146571 A1 May 16, 2019

(30) Foreign Application Priority Data

Nov. 15, 2017 (CN) .......................... 2017 1 1130858

(51) Int. Cl.
  *G06F 11/30* (2006.01)
  *G06F 1/3218* (2019.01)
  (Continued)

(52) U.S. Cl.
  CPC ............ *G06F 1/3218* (2013.01); *G06F 1/266* (2013.01); *G06F 1/28* (2013.01); *G06F 1/30* (2013.01); *G06F 1/3203* (2013.01)

(58) Field of Classification Search
  CPC .......... G06F 1/3218; G06F 1/266; G06F 1/28; G06F 1/30
  (Continued)

(56) References Cited

U.S. PATENT DOCUMENTS 6,125,455 A * 9/2000 Yeo .......................... G06F 1/266
                                                           714/14
7,466,894 B2 * 12/2008 Schiff .................... H02M 3/156
                                                           323/282
(Continued)

FOREIGN PATENT DOCUMENTS

| TW | M429913 U1 | 5/2012 |
| TW | 201321949 A | 6/2013 |
| TW | 201329702 A | 7/2013 |

OTHER PUBLICATIONS

Chinese language office action dated Nov. 9, 2018, issued in application No. TW 106142713.

*Primary Examiner* — Volvick Derose
(74) *Attorney, Agent, or Firm* — McClure, Qualey & Rodack, LLP (57) ABSTRACT

A computer device includes a microprocessor, a voltage converter circuit converting a first voltage of a system power into a second voltage, a control circuit controlling supply of the second voltage and a detection circuit detecting whether power abnormality at the peripheral device has occurred. When confirming that the system power is being supplied normally, the microprocessor generates a first enable signal to enable the voltage converter circuit. When confirming that the voltage converter circuit functions normally, the microprocessor generates a second enable signal to enable the detection circuit. The detection circuit generates a first detection signal according to detection result for the microprocessor to determine whether to supply the second voltage to the peripheral device. When the first detection signal indicates that power abnormality has not occurred, the microprocessor generates a third enable signal to enable the control circuit to supply the second voltage to the peripheral device.

8 Claims, 7 Drawing Sheets

(51) Int. Cl.
    *G06F 1/30*       (2006.01)
    *G06F 1/26*       (2006.01)
    *G06F 1/28*       (2006.01)
    *G06F 1/3203*     (2019.01)

(58) Field of Classification Search
    USPC .......................................................... 713/340
    See application file for complete search history.

(56) References Cited

U.S. PATENT DOCUMENTS

| | | | |
|---|---|---|---|
| 2004/0164617 A1* | 8/2004 | Bobb ..................... | H02J 9/062 307/64 |
| 2005/0046440 A1* | 3/2005 | Phillips ................... | H02J 9/06 307/80 |
| 2005/0200342 A1* | 9/2005 | Rudiak ................ | H02M 3/1588 323/282 |
| 2011/0133715 A1* | 6/2011 | Zushi ................. | G01R 31/024 323/285 |
| 2012/0170327 A1* | 7/2012 | Djenguerian ..... | H02M 3/33523 363/21.12 |
| 2014/0218200 A1* | 8/2014 | Chen ..................... | H02H 3/087 340/644 |
| 2014/0239924 A1* | 8/2014 | Guo ......................... | G05F 1/46 323/271 |
| 2016/0172965 A1* | 6/2016 | Suryanarayana ... | H02M 3/1588 323/234 |

\* cited by examiner

COMPUTER DEVICE AND POWER ABNORMALITY DETECTION METHOD FOR A COMPUTER DEVICE

CROSS REFERENCE TO RELATED APPLICATIONS

This application claims priority of China Patent Application No. 201711130858.X, filed on Nov. 15, 2017, the entirety of which is incorporated by reference herein.

BACKGROUND OF THE INVENTION

Field of the Invention

The disclosure relates to a computer device and a power detection method suitable for a computer device, and more particularly to a computer device that has to connect to an external peripheral device.

Description of the Related Art

A point of Sale (POS) system is an electronic system that is widely used in retail establishments, restaurants, hotels, and other businesses. Its main function is to collect or gather statistics on sales, inventory, and customer purchasing behavior. Through this system, operators can enhance operational efficiency. Therefore, a POS system is today regarded as an indispensable tool in the efficient operation of a modern retail establishment.

In addition to computer software, a POS system usually has the following hardware devices: a host computer, a scanner, a printer, a display, etc. Therefore, the hardware/software related technologies for the POS system are also being continuously developed, so as to improve the performance of POS systems. For example, Taiwan Patent No. 1515603 entitled "DEVICE AND METHOD OF TOUCH CONTROL FEEDBACK AND TOUCH CONTROL DISPLAY DEVICE USING THE SAME" proposed the technology of a touch control feedback device for feeding back the touch behavior of a user to a touch display device. In addition, different retailers also use a number of different devices for their convenience, such as PDAs and other special-purpose handheld devices, and usually have a network to transmit information to a host or server at any time.

Because the POS system's host computer usually needs to connect many peripheral devices, such as the above-mentioned scanner, printer, display, etc., and usually needs to supply power to the peripheral devices, the host computer of the POS system generally has a voltage conversion circuit to supply the appropriate voltage to the peripheral devices.

In order to prevent power interruptions to the peripheral devices, or causing damage to the electronic components of a peripheral device due to an abnormality in the circuit of the host computer or the peripheral device during the power-supply process of the host computer, a detection and protection circuit is provided for protecting the host computer and the peripheral devices.

BRIEF SUMMARY OF THE INVENTION

A computer device and a power abnormality detection method for a computer device are provided. An exemplary embodiment of a computer device coupled to a peripheral device includes a microprocessor, a voltage converter circuit, a control circuit, and a detection circuit. The voltage converter circuit is coupled to the microprocessor and is configured to convert a first voltage of a system power of the computer device into a second voltage. The control circuit is coupled to the microprocessor and the voltage converter circuit and is configured to control supply of the second voltage. The detection circuit is coupled to the microprocessor and a power detection pin and is configured to detect whether a power abnormality at the peripheral device has occurred, wherein the power detection pin is coupled to the peripheral device. When confirming that the system power is being supplied normally, the microprocessor is configured to generate a first enable signal to enable the voltage converter circuit. When confirming that the voltage converter circuit functions normally, the microprocessor is configured to generate a second enable signal to enable the detection circuit, and the detection circuit is configured to generate a first detection signal based on a corresponding detection result. The microprocessor is further configured to determine whether to supply the second voltage to the peripheral device according to the first detection signal, when the first detection signal indicates that a power abnormality has not occurred at the peripheral device, the microprocessor generates a third enable signal to enable the control circuit, such that the second voltage is supplied to the peripheral device via the control circuit.

An exemplary embodiment of a power abnormality detection method suitable for a computer device, which is coupled to a peripheral device and comprising a voltage converter circuit and a detection circuit, the voltage converter circuit being configured to convert a first voltage into a second voltage and the detection circuit being configured to detect whether a power abnormality at the peripheral device has occurred, the method includes: detecting whether system power of the computer device is being supplied normally; when confirming that the system power is being supplied normally, waiting for a first predetermined period of time and then generating a first enable signal to enable the voltage converter circuit when the first predetermined period of time expires; detecting whether the voltage converter circuit functions normally; when confirming that the voltage converter circuit functions normally, generating a second enable signal to enable the detection circuit; detecting whether a power abnormality at the peripheral device has occurred and generating a first detection signal based on the corresponding detection result; determining whether to supply the second voltage to the peripheral device according to the first detection signal, wherein when the first detection signal indicates that a power abnormality has not occurred at the peripheral device, supplying the second voltage to the peripheral device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
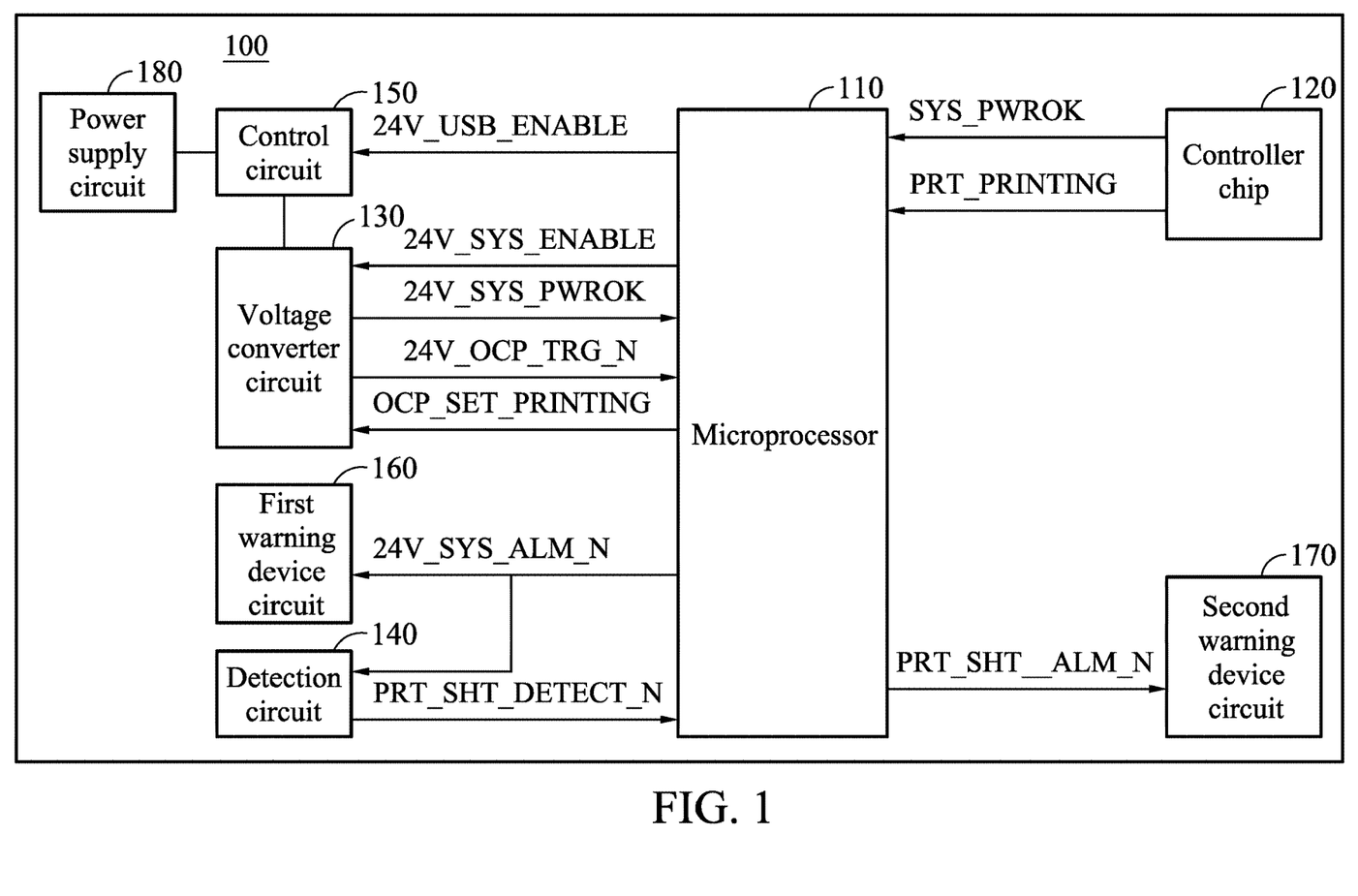
FIG. 1 is an exemplary block diagram of a computer device according to an embodiment of the disclosure.

FIG. 1 is an exemplary block diagram of a computer device according to an embodiment of the disclosure. According to an embodiment of the disclosure, the computer device 100 may be a host computer of a POS system, and may be coupled to a peripheral device 200 (not shown in FIG. 1), such as a scanner, a printer, a display, etc. The computer device 100 may include a microprocessor 110, a controller chip 120, a voltage converter circuit 130, a detection circuit 140, a control circuit 150, a power supply circuit 180, a first warning device circuit 160 and a second warning device circuit 170.

For simplicity, FIG. 1 presents a simplified block diagram, in which only the elements relevant to the disclosure are shown. In addition, FIG. 1 is just one of a plurality of structures to which the invention can be applied. Therefore, it should be understood that the disclosure should not be limited to the elements and structure shown in FIG. 1.

The microprocessor 110 may include a plurality of input/output pins, which are configured to receive/transmit a plurality of detection, control or enable signals (which will be discussed in more detailed in the following paragraphs). The controller chip 120 may be a Platform Controller Hub (PCH) chip, and may be coupled to the microprocessor 110 and configured to connect with other input/output devices (not show in the figure) of the computer device 100 and configured to handle the communications between the microprocessor 110 and the other input/output devices. The voltage converter circuit 130 may be coupled to the microprocessor and configured to convert a first voltage of a system power of the computer device 100 into a second voltage. According to an embodiment of the disclosure, the level of the second voltage is higher than that of the first voltage. As an example, the voltage converter circuit 130 may be a 12V-to-24V voltage converter circuit, which is configured to convert the 12V system voltage provided by the system power into the 24V voltage required by the peripheral device 200.

The detection circuit 140 may be coupled to the microprocessor 110 and a power detection pin and configured to detect whether a power abnormality at the peripheral device 200 has occurred, wherein the power detection pin is coupled to the peripheral device 200. The control circuit 150 may be coupled to the microprocessor 110 and the voltage converter circuit 130 and configured to control supply of the second voltage according to the corresponding enable signal, such that the second voltage can be supplied to the peripheral device 200 via the control circuit 150 and the power supply circuit 180.

For simplicity, the 12V-to-24V voltage conversion is utilized in the following embodiments for illustration. However, it should be noted that the disclosure should not be limited to 12V-to-24V voltage conversion. The proposed power abnormality detection method and the related circuits can be applied to any low-to-high voltage conversion.

According to a first embodiment of the disclosure, the microprocessor 110 may be configured to detect the startup status of the computer device 100. After the system power of the computer device 100 is activated and the system power can be supplied normally, the microprocessor 110 may start to count the time. The microprocessor 110 may wait for a predetermined period of time, for example, 5 seconds, via a timing mechanism, and may enable the voltage converter circuit 130 after the predetermined period of time expires, so as to prevent the system of the computer device 100 from being unable to startup normally when the peripheral device 200 draws an excessive current from the computer device 100 at the moment when the computer device 100 is starting up.

Generally, the peripheral device 200 is already connected to the computer device 100 before the computer device 100 is powered on, and usually, there may be some large capacitor configured at the peripheral device 200 for replenishing current when the peripheral device 200 is operating. Due to such condition, a current-overloading (for example, the output current exceeds a predetermined threshold) protection mechanism may be triggered at the moment when the motherboard of the computer device 100 is powered on, causing the system of the computer device 100 failing to startup normally. Therefore, according to the first embodiment of the invention, when confirming that system power is being supplied normally, the microprocessor 110 may be configured to wait for a predetermined period of time, and then generate the first enable signal to enable the voltage converter circuit 130, so as to avoid the problem of the system of the computer device 100 being unable to startup normally when the peripheral device 200 draws an excessive current from the computer device 100 at the moment when the computer device 100 is starting up as discussed above.

According to an embodiment of the disclosure, the controller chip 120 may be configured to detect whether system power is ready and is being supplied to the computer device 100 normally, and to generate a detection signal SYS_P-WROK (the second detection signal) based on the corresponding detection result. After the microprocessor 110 is powered on, the microprocessor 110 may detect the voltage level of the second detection signal SYS_PWROK. For example, when system power is not ready or is not being supplied to the computer device 100 normally, the controller chip 120 may set the voltage level of the second detection signal SYS_PWROK to a low voltage level. When system power is ready and can be supplied normally to the computer device 100 (for example, when each power required by the computer device 100 has been converted completely), the controller chip 120 may set the voltage level of the second detection signal SYS_PWROK to a high voltage level.

The microprocessor 110 may receive the second detection signal SYS_PWROK and control the voltage level of an enable signal 24V_SYS_ENABLE (the first enable signal) based on the voltage level of the second detection signal SYS_PWROK, wherein the voltage level of the first enable signal 24V_SYS_ENABLE may be set to a low voltage level by default. As discussed above, the microprocessor 110 may start to count for a predetermined period of time (the first predetermined period of time) when detecting that the voltage level of the second detection signal SYS_PWROK is changed from low to high, and then pull the voltage level of the first enable signal 24V_SYS_ENABLE from low up to high when the first predetermined period of time expires, so as to enable the voltage converter circuit 130.

The voltage converter circuit 130 is enabled in response to the first enable signal 24V_SYS_ENABLE, and is configured to convert the 12V system voltage (the first voltage) provided by the system power into 24V (the second voltage) voltage required by the peripheral device 200.

According to a second embodiment of the disclosure, the microprocessor 110 may be configured to detect the voltage conversion status of the voltage converter circuit 130 and then generate the enable signal 24V_SYS_ALM_N (the second enable signal) when confirming that the voltage converter circuit 130 functions normally, so as to enable the detection circuit 140. In addition, if the voltage converter circuit 130 cannot function normally, the microprocessor 110 may trigger the first warning device circuit 160 to generate the warning signal via the second enable signal 24V_SYS_ALM_N, so as to prompt the user to check for the abnormality.

According to an embodiment of the disclosure, the voltage converter circuit 130 may include a processor (not shown in the figure) configured to detect whether the second voltage can be supplied normally, and generate a detection signal 24V_SYS_PWROK (the third detection signal) based on the corresponding detection result. For example, the voltage level of the third detection signal 24V_SYS_PWROK may be set to a low voltage level by default, and the voltage converter circuit 130 may be configured to pull the voltage level of the third detection signal 24V_SYS_PWROK from low to high when detecting that the second voltage can be supplied normally, so as to notify the microprocessor 110 of such a condition.

In addition, the voltage converter circuit 130 may be further configured to detect whether an output current of the voltage converter circuit 130 is overloaded, for example, exceeds a predetermined threshold, and generate a detection signal 24V_OCP_TRG_N (the fourth detection signal) based on the corresponding detection result. For example, when the voltage level of the fourth detection signal 24V_OCP_TRG_N is set to a high voltage level, it means that the current is not overloaded. When the voltage level of the fourth detection signal 24V_OCP_TRG_N is set to a low voltage level, it means that the current is overloaded.

The microprocessor 110 may be configured to generate the second enable signal 24V_SYS_ALM_N according to the third detection signal 24V_SYS_PWROK and the fourth detection signal 24V_OCP_TRG_N.

According to an embodiment of the disclosure, when the voltage level of any of the third detection signal 24V_SYS_PWROK and the fourth detection signal 24V_OCP_TRG_N is pulled down to the low voltage level, the microprocessor 110 may pull the voltage level of the second enable signal 24V_SYS_ALM_N from high to low, so as to trigger the first warning device circuit 160 to generate the warning signal. According to an embodiment of the disclosure, the first warning device circuit 160 may include at least a warning device, such as an LED lamp, a vibrator, a speaker, and the corresponding driving circuit.

Figure 2A:
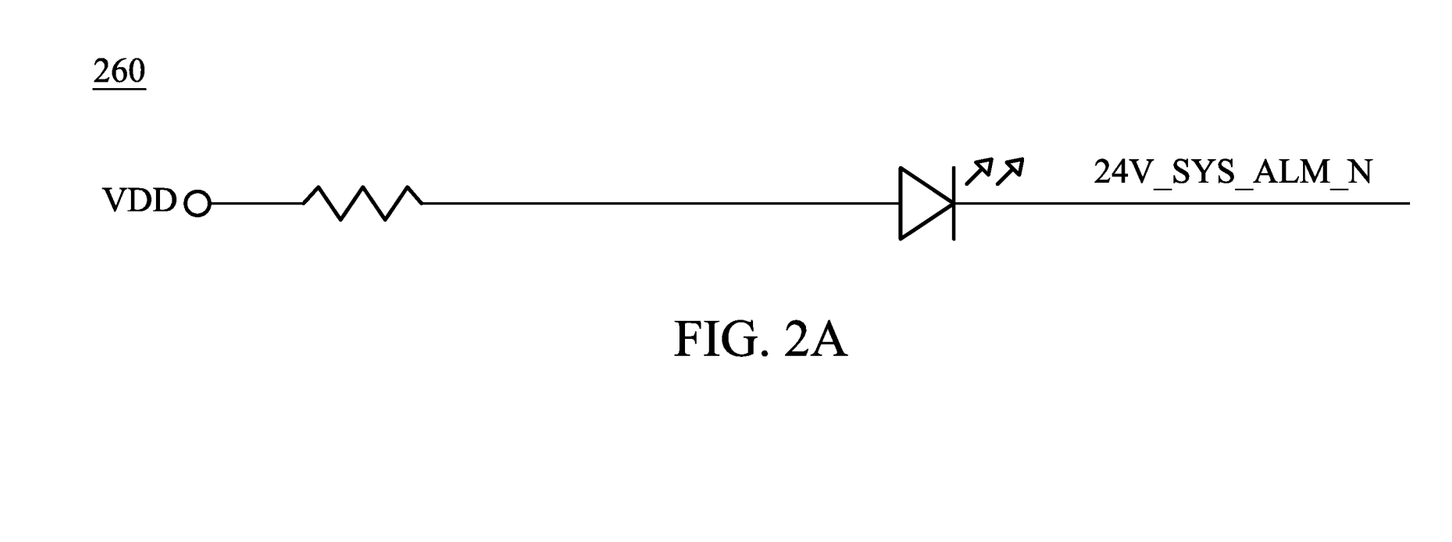
FIG. 2A is an exemplary circuit diagram of the first warning device circuit according to an embodiment of the disclosure.

FIG. 2A is an exemplary circuit diagram of the first warning device circuit according to an embodiment of the disclosure. The first warning device circuit 260 may include an LED lamp. When the voltage level of the second enable signal 24V_SYS_ALM_N is pulled down from high to low, the LED lamp will be lit to prompt the user to check for the abnormality.

On the other hand, when the levels of the detection signals 24V_SYS_PWROK and 24V_OCP_TRG_N are both pulled high, the microprocessor 110 may set the voltage level of the second enable signal 24V_SYS_ALM_N to the high voltage level, so as to enable the detection circuit 140.

In the embodiments of the disclosure, the microprocessor 110 enables the detection circuit 140 to detect whether a power abnormality at the peripheral device has occurred only when confirming that system power is being supplied normally to the computer device 100, the voltage converter circuit 130 functions normally and the second voltage is supplied normally and the output current of the voltage converter circuit 130 is not overloaded.

Figure 3:
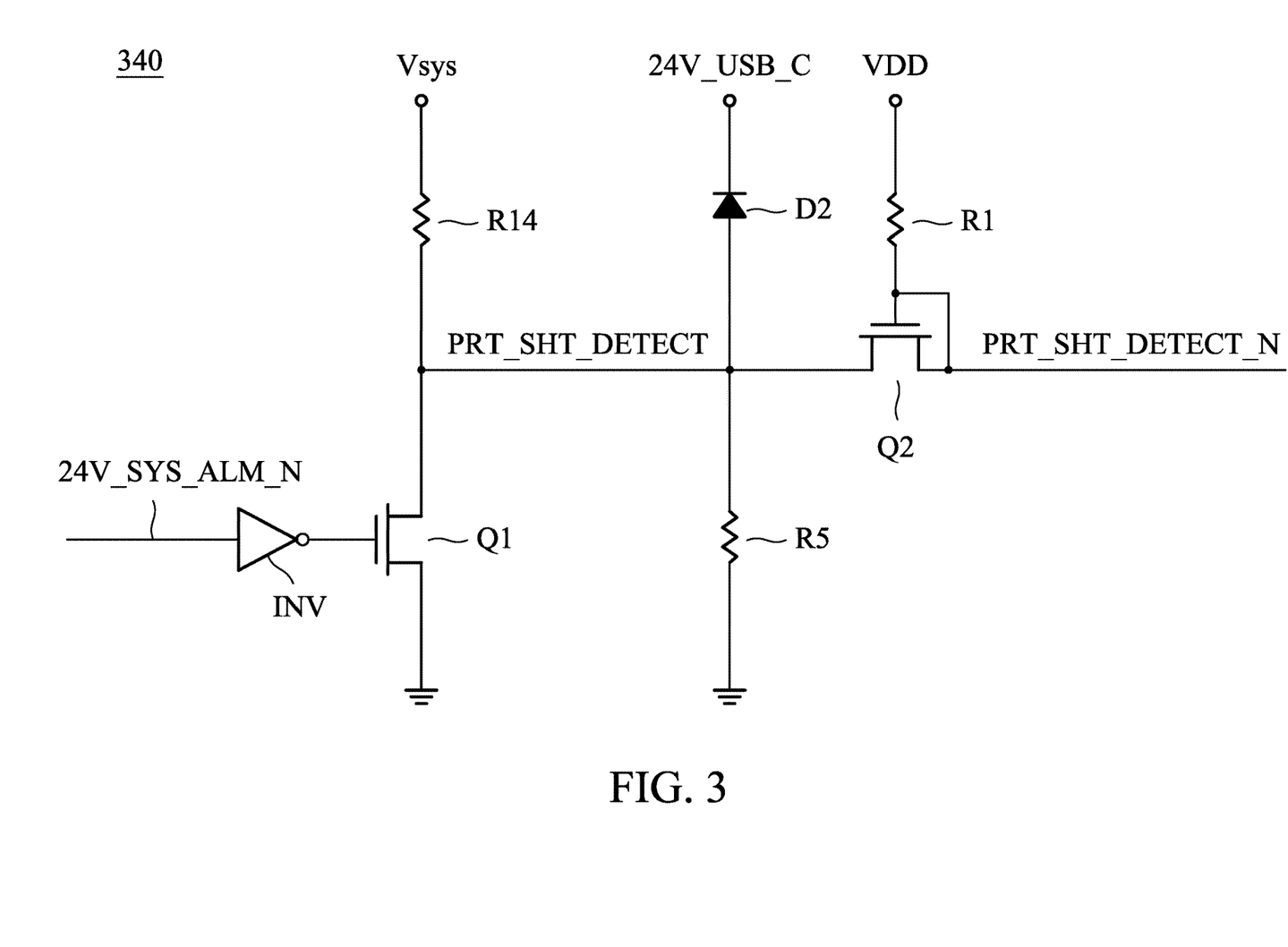
FIG. 3 is an exemplary circuit diagram of the detection circuit according to an embodiment of the disclosure.

FIG. 3 is an exemplary circuit diagram of the detection circuit according to an embodiment of the disclosure. The detection circuit 340 may include an inverter INV, a diode D2, resistors R14 and R5 and transistors Q1 and Q2. The inverter INV includes an input terminal configured to receive the second enable signal 24V_SYS_ALM_N and an output terminal coupled to a detection node PRT_SHT_DETECT. The diode D2 is coupled between the power detection pin 24V_USB_C and the detection node PRT_SHT_DETECT. According to an embodiment of the invention, the power detection pin 24V_USB_C may be coupled to the peripheral device 200. For example, the power detection pin 24V_USB_C may be coupled to a power receiving circuit (not shown in the figure) of the peripheral device 200.

The resistor R14 is coupled between a voltage input terminal for receiving the system voltage Vsys and the detection node PRT_SHT_DETECT. In this embodiment, the system voltage Vsys is 12V. The resistor R5 is coupled between the detection node PRT_SHT_DETECT and the ground node.

The transistor Q1 is coupled between the detection node PRT_SHT_DETECT and the ground node. It should be noted that although in this embodiment, the transistor Q1 is configured to receive the second enable signal 24V_SYS_ALM_N via the inverter INV, the invention should not be limited thereto. For example, when the transistor Q1 is implemented as a PMOS transistor, the control electrode of the transistor may also directly receive the second enable signal 24V_SYS_ALM_N without via the inverter INV.

The transistor Q2 is coupled between the detection node PRT_SHT_DETECT and a detection signal output terminal and includes a control electrode coupled to a voltage input terminal configured to receive another system voltage VDD. In this embodiment, the system voltage VDD may be 3.3V, and the detection signal output terminal is configured to output the detection signal PRT_SHT_DETECT (the first detection signal).

According to an embodiment of the disclosure, the detection circuit 140/340 is configured to detect whether a power abnormality has occurred at the peripheral device 200 by using the first voltage provided by the system (that is, the system voltage Vsys) before the voltage converter circuit 130 supplies the second voltage to the peripheral device 200. The power abnormality may be caused by the damaged electronic component or damaged power receiving circuit of the peripheral device 200, which may result in a short circuit in the internal circuit of the peripheral device 200.

According to an embodiment of the disclosure, the level of voltage at the detection node PRT_SHT_DETECT varies with the level of voltage at the power detection pin 24V_USB_C and the on-off status of the transistor Q1.

In the embodiment of the disclosure, the activation and deactivation of the detection function of the detection circuit 140/340 may be implemented via the transistor Q1.

When the second enable signal 24V_SYS_ALM_N has a low voltage level, it means that the second voltage cannot be normally supplied or the current-overloading problem of the voltage converter circuit 130 has occurred. At this time, the transistor Q1 is turned on in response to the output of the inverter INV and the 12V system voltage Vsys is coupled to the ground node via the resistor R14, by which the detection function of the detection circuit 140/340 is deactivated, and the 12V system power Vsys will not be supplied to the peripheral device 200 via the diode D2 as well.

On the other hand, when the second enable signal 24V_SYS_ALM_N has a high voltage level, the transistor Q1 is turned off in response to the output of the inverter INV, by which the detection function of the detection circuit 140/340 is activated.

In the embodiments of the disclosure, the detection function of the detection circuit 140/340 may be implemented via the resistors R14 and R5 and the diode D2, and the function of reporting the detection result may be implemented via the transistor Q2 and the resistor R1.

When no power abnormality has occurred at the peripheral device 200, the voltage level of the power detection pin 24V_USB_C is floating, and may be decided based on the subsequent voltage level at the detection node PRT_SHT_DETECT. The resistors R14 and R5 coupled in serial form a voltage divider circuit. The voltage divider circuit generates a divided voltage at the detection node PRT_SHT_DETECT according to the system voltage Vsys. For example, when the system voltage Vsys is 12V, the divided voltage generated at the detection node PRT_SHT_DETECT may be about 8V. At this time, the transistor Q2 is turned off, and the voltage level at the detection signal output terminal will be pulled up to the level of the system voltage VDD via the resistor R1, such that the voltage level of the first detection signal PRT_SHT_DETECT_N is kept at about the 3.3V high voltage level.

On the other hand, when a power abnormality has occurred at the peripheral device 200, the voltage level of the power detection pin 24V_USB_C may be pulled down to the ground voltage level (low voltage level) due to the short circuit. At this time, the diode D2 is turned on to pull down the voltage level at the detection node PRT_SHT_DETECT to the ground voltage level (low voltage level). Meanwhile, since the voltage level at the drain of the transistor Q2 is pulled low and the body-diode exists in the transistor Q2, the voltage level at the source of the transistor Q2 is also pulled down, thereby turning on the transistor Q2. In this manner, the voltage level of the first detection signal PRT_SHT_DETECT_N is pulled down from the high voltage level to the low voltage level.

It should be noted that, in the embodiment of the disclosure, since the peripheral device usually includes capacitors, the detection time of the detection circuit 140/340 may be lengthened: for example, it may last for a second predetermined period of time (such as 3 seconds), so as to obtain a more accurate detection result.

According to an embodiment of the disclosure, the microprocessor 110 may determine whether to supply the second voltage to the peripheral device 200 according to the voltage level of the first detection signal PRT_SHT_DETECT_N. When the first detection signal PRT_SHT_DETECT_N has a high voltage level, it indicates that no power abnormality has occurred at the peripheral device 200, the microprocessor 110 sets the voltage level of the enable signal 24V_USB_ENABLE (the third enable signal) to a high voltage level, accordingly, such that the second voltage is supplied to the peripheral device 200 via the control circuit 150 and the power supply circuit 180. As discussed above, in the embodiment of the invention, the microprocessor 110 actually sets the voltage level of the third enable signal 24V_USB_ENABLE based on the voltage levels of the third detection signal 24V_SYS_PWROK, the fourth detection signal 24V_OCP_TRG_N and the first detection signal PRT_SHT_DETECT_N.

On the other hand, when the first detection PRT_SHT_DETECT_N has a low voltage level, it means that a power abnormality has occurred at the peripheral device 200, the microprocessor 110 may pull down the voltage level of the fourth enable signal PRT_SHT_ALM_N from high to low, so as to trigger the second warning device circuit 170 to generate a warning signal. According to an embodiment of the invention, the second warning device circuit 170 may include at least a warning device, such as an LED lamp, a vibrator, a speaker, and the corresponding driving circuit.

Figure 2B:
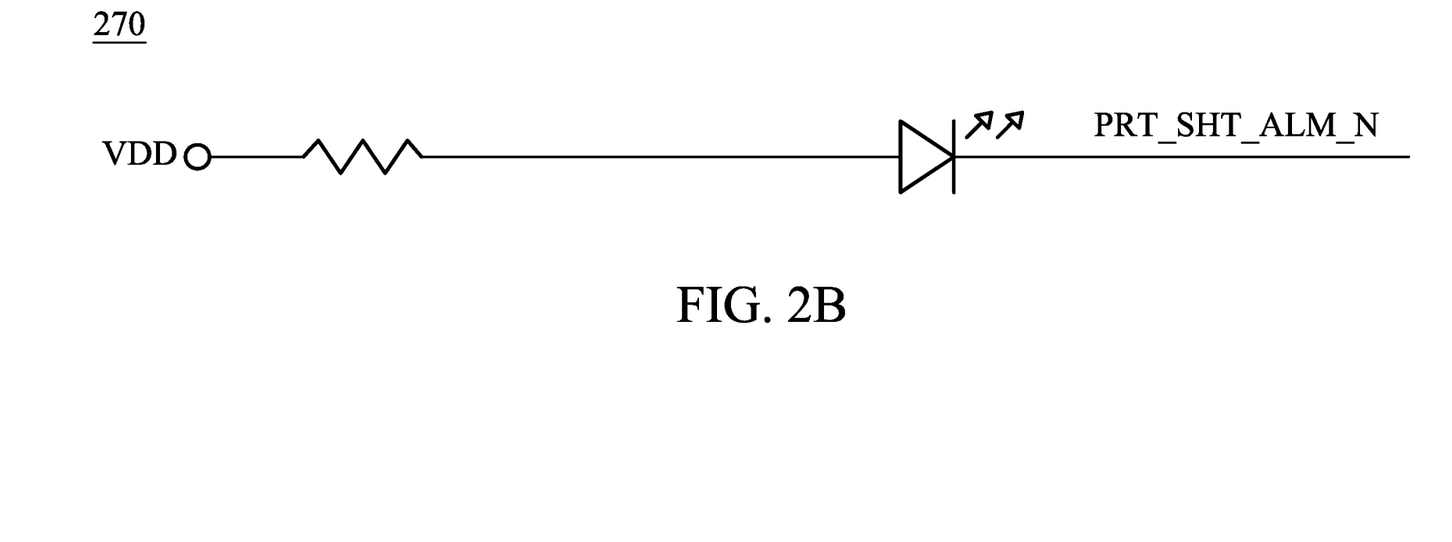
FIG. 2B is an exemplary circuit diagram of the second warning device circuit according to an embodiment of the disclosure.

FIG. 2B is an exemplary circuit diagram of the second warning device circuit according to an embodiment of the disclosure. The second warning device circuit 270 may include an LED lamp. When the voltage level of the fourth enable signal PRT_SHT_ALM_N is pulled down from high to low, the LED lamp will be lit to prompt the user to check for the abnormality.

Figure 4:
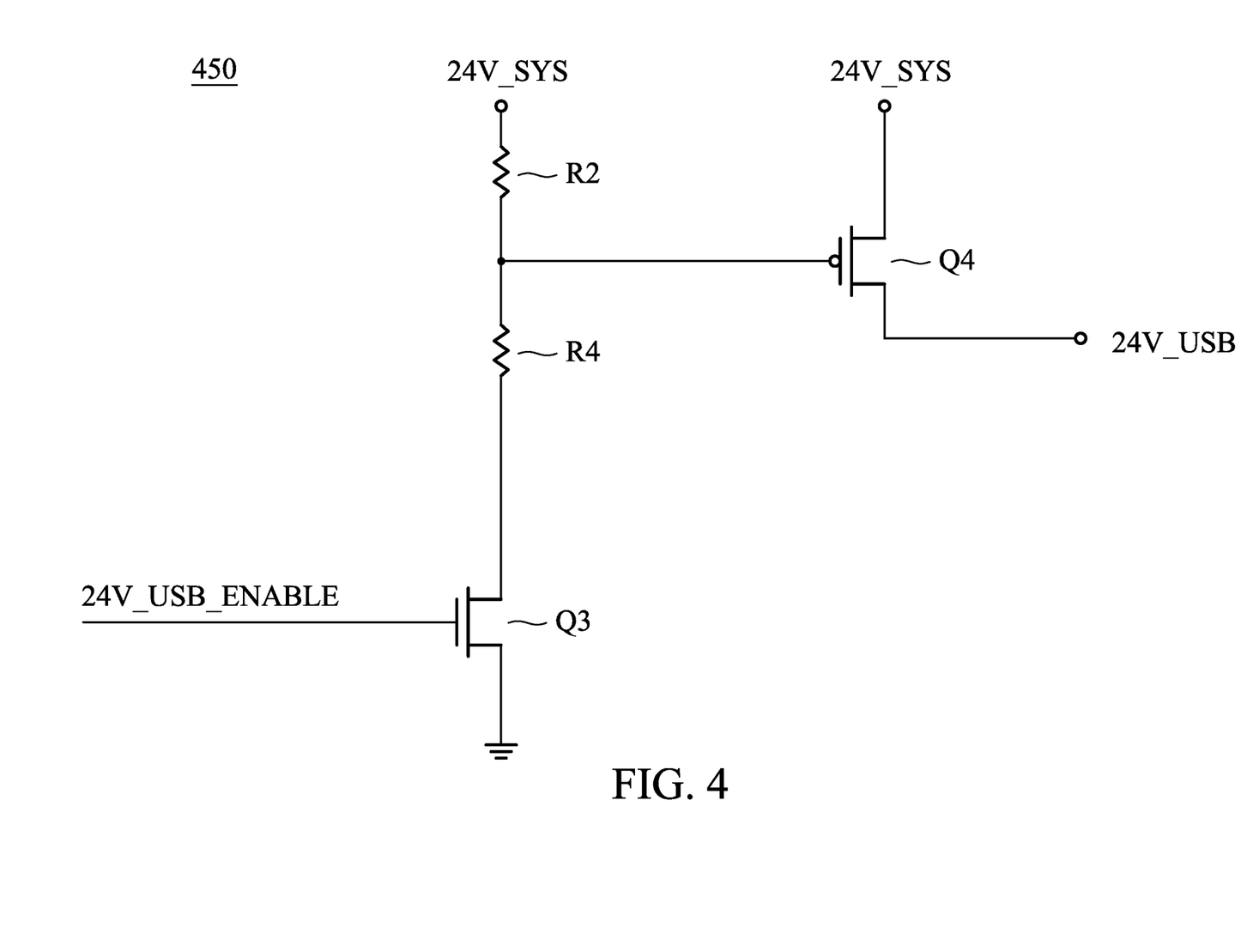
FIG. 4 is an exemplary circuit diagram of a control circuit according to an embodiment of the disclosure.

FIG. 4 is an exemplary circuit diagram of a control circuit according to an embodiment of the disclosure. The control circuit 150/450 is coupled to the voltage converter circuit 130 and configured to receive the output voltage 24V_SYS (that is, the second voltage) of the voltage converter circuit 130. In addition, the control circuit 150/450 is coupled to the microprocessor 110 for receiving the third enable signal 24V_USB_ENABLE and is configured to control the supply of the second voltage based on the voltage level of the third enable signal 24V_USB_ENABLE.

According to an embodiment of the disclosure, the control circuit 450 may include transistors Q3 and Q4 and resistors R2 and R4. When the third enable signal 24V_USB_ENABLE has a high voltage level, the transistor Q3 is turned on and the resistors R2 and R4 form a voltage divider circuit. The voltage divider circuit generates a divided voltage according to the second voltage 24V_SYS, so as to pull down the voltage at the control electrode of the transistor Q4, thereby turning on the transistor Q4. When the transistor Q4 is turned on, the second voltage is provided to the power supplying node 24V_USB.

On the other hand, when the third enable signal 24V_USB_ENABLE has a low voltage level, the transistor Q3 is turned off. At this time, the resistors R2 and R4 do not form a voltage divider circuit, and the voltage at the control electrode of the transistor Q4 is not pulled down. Therefore, when the third enable signal 24V_USB_ENABLE has a low voltage level, the transistor Q4 will not be turned on, and the second voltage will not be provided to the power supplying node 24V_USB.

Figure 5:
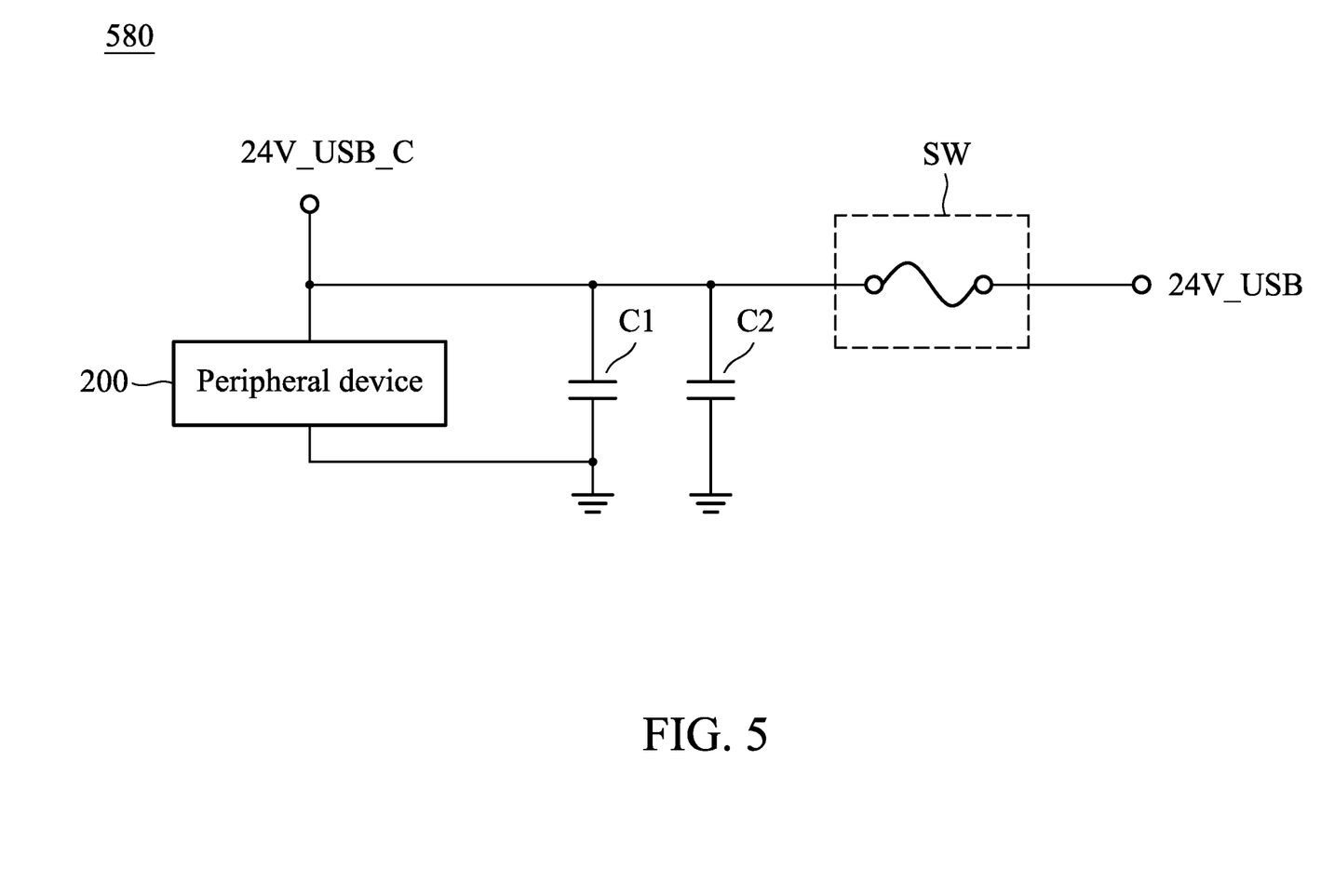
FIG. 5 is an exemplary circuit diagram of a power supply circuit according to an embodiment of the disclosure.

FIG. 5 is an exemplary circuit diagram of a power supply circuit according to an embodiment of the disclosure. The power supply circuit 580 may include a switch device SW and capacitors C1 and C2. The switch device SW may be a fuse and configured to protect the peripheral device 200. The power supply circuit 580 is configured to provide the second voltage output at the power supplying node 24V_USB to the peripheral device 200 via the switch device SW.

In the conventional design, when a power abnormality has occurred at the peripheral device, the electronic components of the peripheral device and/or of the computer device may be damaged due the slow response of the switch device SW. For example, when the response time of the switch device SW is too long, the control circuit 150/450 cannot be protected on time, and the transistor Q4 inside of the control circuit 150/450 may be burned. However, in the proposed structure, the second voltage is supplied to the peripheral device 200 only when the microprocessor 110 confirms that no power abnormality has occurred at the peripheral device. In this manner, the above-mentioned problem can be solved.

Besides the detection and protection circuit/method utilized before the power is supplied to the peripheral device as discussed above, in the fourth embodiment of the invention, the value of current-overloading setting of the voltage converter circuit 130 may also be dynamically adjusted based on the operation of the peripheral device, so as to provide protection in different ways. For example, a default setting value may be utilized for a normal current-overloading protection, and another setting value may be utilized for current-overloading protection when the loading is high. For example, when the peripheral device is a printer, the current-overloading setting may include two selectable values. When the printer is performing a printing job, the voltage converter circuit 130 may adjust the value of the current-overloading setting to a relatively high value. When the printer is not performing a printing job, the voltage converter circuit 130 may adjust the value of the current-overloading setting to a relatively low value (a default value).

According to an embodiment of the disclosure, the microprocessor 110 may determine the operation status of the peripheral device (suppose that the peripheral device is a printer in this embodiment) according to the detection signal provided by the controller chip 120, such as the detection signal PRT_PRINTING (the fifth detection signal). When the printer is performing a printing job, the controller chip 120 may pull the voltage level of the fifth detection signal PRT_PRINTING from a low voltage level to a high voltage level. The microprocessor 110 may pull the voltage level of the control signal OCP_SET_PRINTING from low to high when detecting that the voltage level of the fifth detection signal PRT_PRINTING is changed from low to high.

When the processor of the voltage converter circuit 130 detects that the voltage level of the control signal OCP_SET_PRINTING is changed from low to high, the voltage converter circuit 130 may adjust the value of the current-overloading setting to a relatively high value.

When the printer finishes the printing job or does not perform the printing job, the controller chip 120 pulls low the voltage level of the fifth detection signal PRT_PRINTING. The microprocessor 110 may pull the voltage level of the control signal OCP_SET_PRINTING from high to low when detecting that the voltage level of the fifth detection signal PRT_PRINTING is low. When the processor of the voltage converter circuit 130 detects that the voltage level of the control signal OCP_SET_PRINTING is low, the voltage converter circuit 130 may adjust the value of the current-overloading setting to a default value.

Figure 6A:
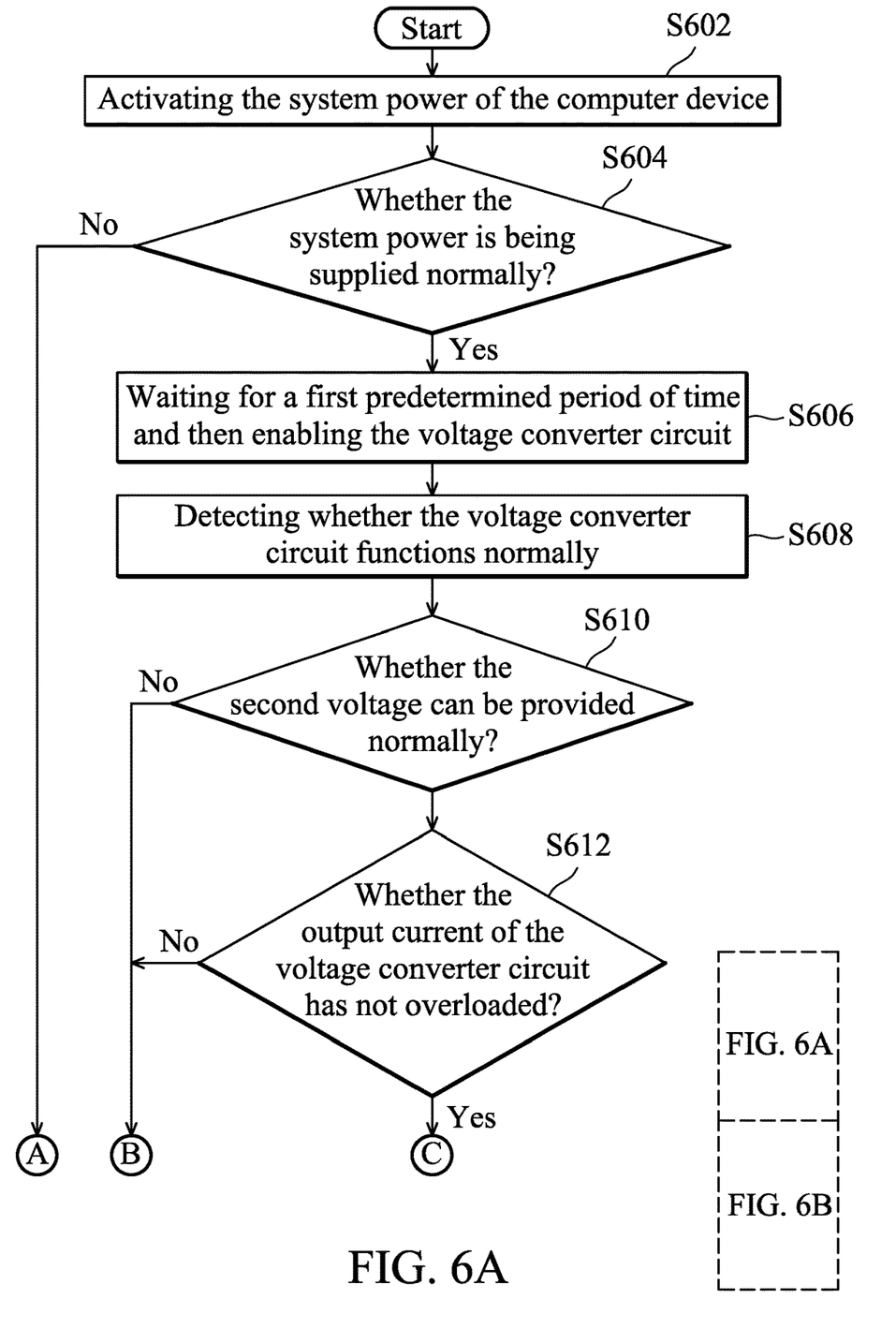
FIGS. 6A and 6B show an exemplary flow chart of a power abnormality detection method according to an embodiment of the disclosure.
Figure 6B:
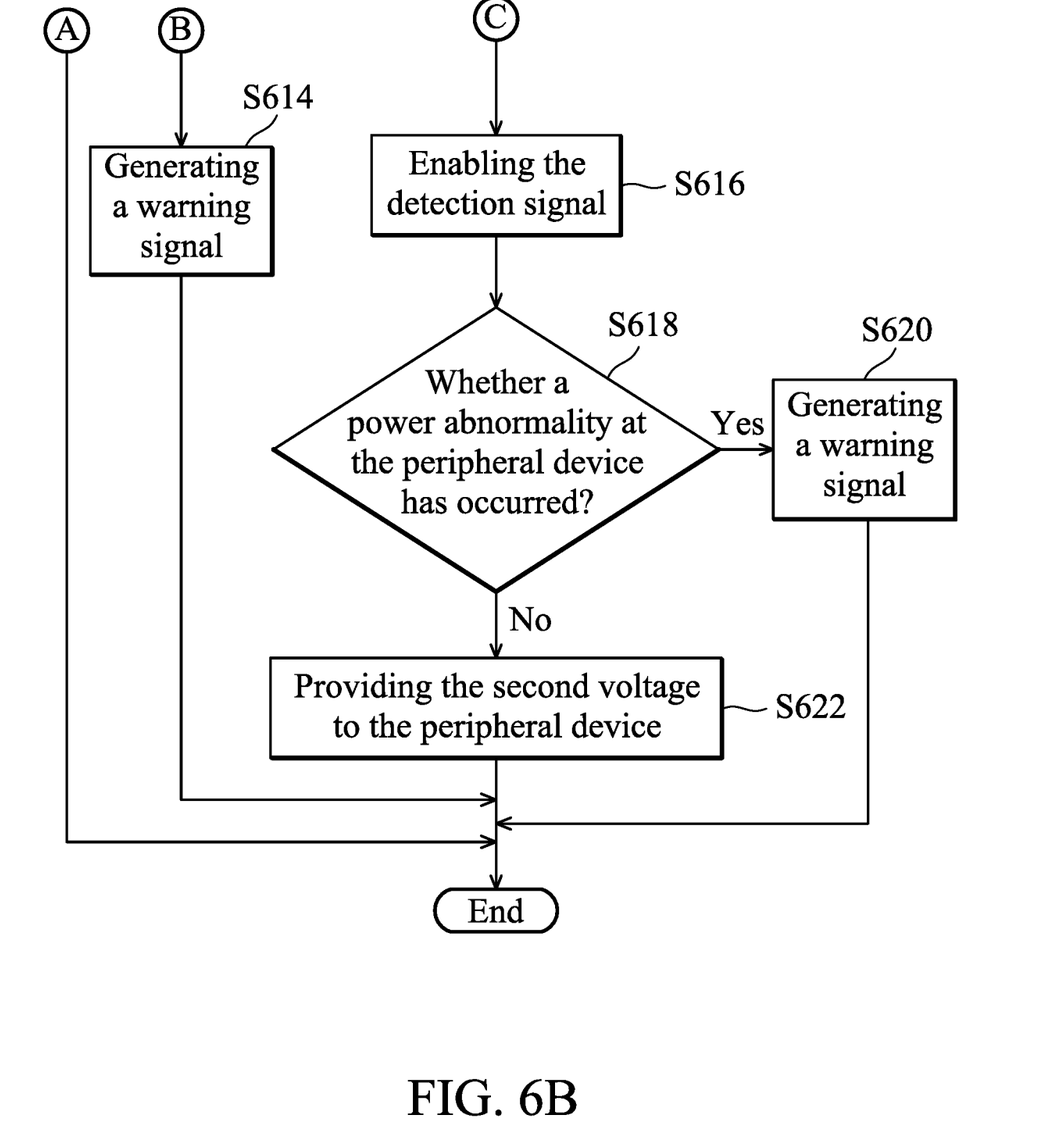

FIGS. 6A and 6B show an exemplary flow chart of a power abnormality detection method according to an embodiment of the disclosure. First of all, the system power of the computer device 100 is activated (Step S602), and whether system power is being supplied normally is detected (Step S604). If so, the microprocessor waits for a first predetermined period of time and then generates a first enable signal to enable the voltage converter circuit when the first predetermined period of time expires (Step S606). After enabling the voltage converter circuit, whether the voltage converter circuit can function normally is detected (Step S608). The determination of whether the voltage converter circuit can function normally may include whether the second voltage can be normally provided (Step S610) and whether overloading of the output current of the voltage converter circuit has not occurred (Step S612). If the second voltage cannot be supplied or overloading of the output current of the voltage converter circuit has occurred, a warning signal is generated (Step S614). If the second voltage can be supplied normally and overloading of the output current of the voltage converter circuit has not occurred, the detection circuit is enabled (Step S616) to detect whether a power abnormality has occurred at the peripheral device (Step S618). According to an embodiment of the invention, the process of detecting whether a power abnormality at the peripheral device has occurred (i.e. the performance of step S618) may last for a second predetermined period of time.

When power abnormality at the peripheral device has occurred, a warning signal is generated (Step S620). When power abnormality at the peripheral device has not occurred, the second voltage is provided to the peripheral device (Step S622). If the system power cannot be normally supplied, the second voltage cannot be normally supplied, overloading of the output current of the voltage converter circuit has occurred or power abnormality at the peripheral device has occurred, the second voltage is not provided to the peripheral device.

As discussed above, in the proposed structure, the second voltage is supplied to the peripheral device 200 only when the microprocessor 110 confirms that system power is being supplied normally, the second voltage is supplied normally, the output current of the voltage converter circuit 130 is not overloaded and no power abnormality has occurred at the peripheral device. In this manner, the problem of unable to provide power to the peripheral device or the problem of damaging the electronic component of the peripheral device due to the abnormality of the circuit of the host computer or the peripheral device can be solved. In addition, besides the detection and protection circuit/method utilized before the power is supplied to the peripheral device as discussed above, the value of current-overloading setting of the voltage converter circuit 130 may also be dynamically adjusted based on the operation of the peripheral device, so as to provide protection in different ways.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A computer device coupled to a peripheral device, comprising:
   a microprocessor;
   a voltage converter circuit, coupled to the microprocessor and configured to convert a first voltage of a system power of the computer device into a second voltage;
   a control circuit, coupled to the microprocessor and the voltage converter circuit and configured to control supply of the second voltage; and a detection circuit, coupled to the microprocessor and a power detection pin and configured to detect whether a power abnormality at the peripheral device has occurred, wherein the power detection pin is coupled to the peripheral device, and wherein when confirming that the system power is being supplied normally, the microprocessor is configured to generate a first enable signal to enable the voltage converter circuit, and when confirming that the voltage converter circuit functions normally, the microprocessor is configured to generate a second enable signal to enable the detection circuit, and the detection circuit is configured to generate a first detection signal based on a corresponding detection result, and wherein the microprocessor is further configured to determine whether to supply the second voltage to the peripheral device according to the first detection signal, when the first detection signal indicates that a power abnormality has not occurred at the peripheral device, the microprocessor generates a third enable signal to enable the control circuit, such that the second voltage is supplied to the peripheral device via the control circuit, wherein the voltage converter circuit is further configured to detect whether the second voltage is supplied normally and generate a third detection signal based on a corresponding detection result, and the voltage converter circuit is further configured to detect whether an output current thereof is overloaded and generate a fourth detection signal based on a corresponding detection result, and wherein the microprocessor is further configured to generate the second enable signal according to the third detection signal and the fourth detection signal.

2. The computer device as claimed in claim 1, wherein when confirming that the system power is being supplied normally, the microprocessor is configured to wait for a predetermined period of time and then generate the first enable signal when the predetermined period of time expires.

3. The computer device as claimed in claim 1, further comprising:
a controller chip, coupled to the microprocessor, configured to detect whether the system power is being supplied to the computer device normally and to generate a second detection signal based on a corresponding detection result, wherein the microprocessor is configured to generate the first enable signal according to the second detection signal.

4. The computer device as claimed in claim 1, wherein the detection circuit comprises:
a diode, coupled between the power detection pin and a detection node;
a first resistor, coupled between a voltage input terminal and the detection node; and
a second resistor, coupled between the detection node and a ground node, wherein a level of voltage at the detection node varies with a level of voltage at the power detection pin.

5. The computer device as claimed in claim 4, wherein the detection circuit further comprises:
a first transistor, coupled to the detection node and comprising a control electrode configured to receive the second enable signal.

6. The computer device as claimed in claim 4, wherein the detection circuit further comprises:
a second transistor, coupled between the detection node and a detection signal output terminal, wherein the detection signal output terminal is configured to output the first detection signal.

7. A power abnormality detection method, suitable for a computer device which is coupled to a peripheral device, the computer device comprising a voltage converter circuit and a detection circuit, the voltage converter circuit being configured to convert a first voltage into a second voltage, the detection circuit being configured to detect whether a power abnormality at the peripheral device has occurred, the method comprising:
detecting whether a system power of the computer device is being supplied normally;
when confirming that the system power is being supplied normally, waiting for a first predetermined period of time and then generating a first enable signal to enable the voltage converter circuit when the first predetermined period of time expires;
detecting whether the voltage converter circuit functions normally;
when confirming that the voltage converter circuit functions normally, generating a second enable signal to enable the detection circuit;
detecting whether a power abnormality at the peripheral device has occurred and generating a first detection signal based on a corresponding detection result;
determining whether to supply the second voltage to the peripheral device according to the first detection signal, wherein when the first detection signal indicates that a power abnormality has not occurred at the peripheral device, supplying the second voltage to the peripheral device,
detecting whether the second voltage is supplied normally and generating a second detection signal based on a corresponding result; and
detecting whether an output current of the voltage converter circuit is overloaded and generating a third detection signal based on a corresponding detection result; and
generating the second enable signal according to the second detection signal and the third detection signal.

8. The power abnormality detection method as claimed in claim 7, wherein performance of the step of detecting whether a power abnormality at the peripheral device has occurred has lasted for a second predetermined period of time.

* * * * *